United States Patent
Avadhanam

(10) Patent No.: US 7,840,382 B2
(45) Date of Patent: Nov. 23, 2010

(54) METHODS AND APPARATUS FOR NETWORK RE-CREATION IN CONTROLLED ENVIRONMENTS

(75) Inventor: Phani Bhushan Avadhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 11/549,088

(22) Filed: Oct. 12, 2006

(65) Prior Publication Data

US 2008/0091976 A1  Apr. 17, 2008

(51) Int. Cl.
   G06F 17/40 (2006.01)
(52) U.S. Cl. .................................................. 702/187
(58) Field of Classification Search ................ 702/127, 702/176, 187, 188, 183, 185; 709/223, 224; 455/3.01, 95, 151.2, 556.2; 714/43; 370/242, 370/254
   See application file for complete search history.

(56) References Cited

U.S. PATENT DOCUMENTS

| | | | |
|---|---|---|---|
| 6,263,338 B1 * | 7/2001 | Ronstrom et al. ............... 707/8 |
| 2006/0025142 A1 * | 2/2006 | Hamilton .................... 455/446 |
| 2007/0271273 A1 * | 11/2007 | Cradick et al. ................. 707/10 |
| 2007/0277182 A1 * | 11/2007 | Chen et al. ................... 719/315 |
| 2008/0008097 A1 * | 1/2008 | Avadhanam ................. 370/235 |
| 2008/0085685 A1 * | 4/2008 | Mantravadi et al. ....... 455/115.3 |

FOREIGN PATENT DOCUMENTS

| | | |
|---|---|---|
| EP | 1549092 | 6/2005 |
| EP | 1626596 | 2/2006 |
| WO | 9923849 | 5/1999 |
| WO | 0239545 | 5/2002 |

OTHER PUBLICATIONS

International Search Report, PCT/US07/080799, International Search Authority, European Patent Office, Jul. 24, 2008.
Written Opinion, PCT/US07/080799, International Search Authority, European Patent Office, Jul. 24, 2008.

* cited by examiner

Primary Examiner—Michael P Nghiem
(74) Attorney, Agent, or Firm—Sandip S. Minhas; Gerald P. Joyce, III

(57) ABSTRACT

Methods and apparatus for network re-creation in controlled environments. In an aspect, a method for network re-creation is provided. The method includes determining a logging window, logging at least one re-creation parameter during the logging window to produce a re-creation log, and storing the re-creation log. In an aspect, an apparatus for network re-creation is provided. The apparatus includes a re-creation processor configured to determine a logging window, and log at least one re-creation parameter during the logging window to produce a re-creation log, and log storage configured to store the re-creation log. In an aspect, a method for network re-creation is provided. The method includes obtaining a re-creation log, determining at least one re-creation parameter from the re-creation log, and re-creating a network environment based on the at least one re-creation parameter.

16 Claims, 8 Drawing Sheets

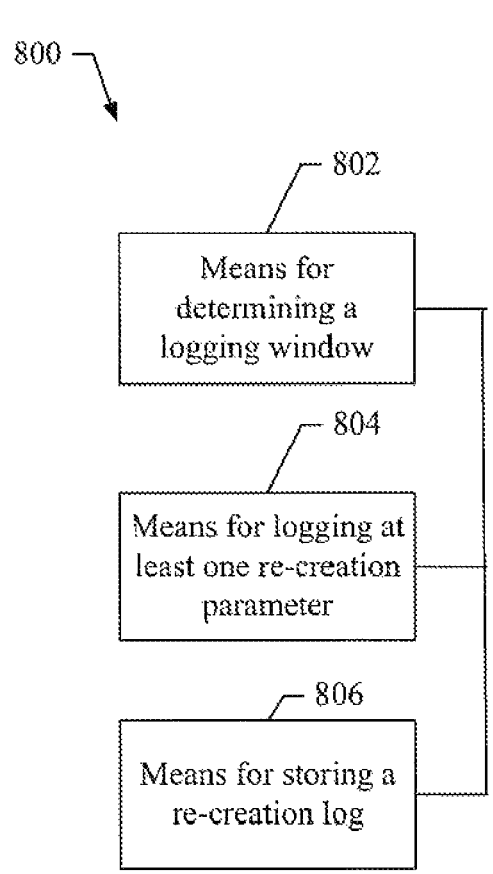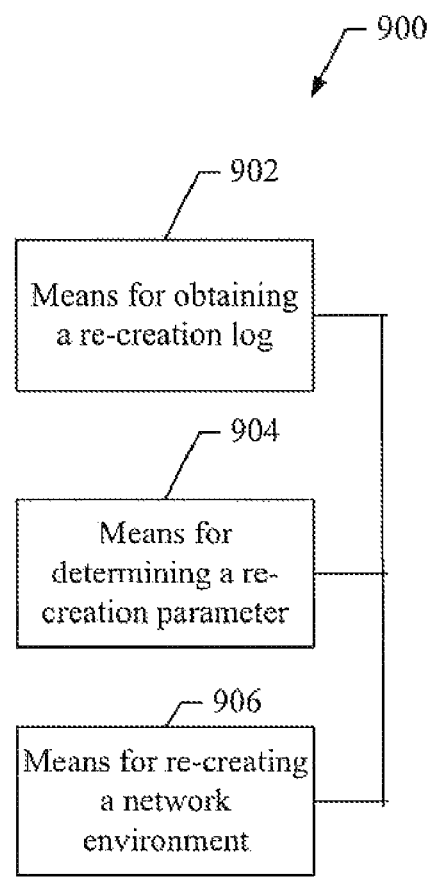
FIG. 8
FIG. 9

METHODS AND APPARATUS FOR NETWORK RE-CREATION IN CONTROLLED ENVIRONMENTS

BACKGROUND

1. Field

The present application for patent relates generally to communication systems, and more particularly, to methods and apparatus for network re-creation in controlled environments.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed and delivered to devices on a network. For example, a communication network may utilize Orthogonal Frequency Division Multiplexing (OFDM) to provide communications between a network server and one or more mobile devices. In this technology, a stream of OFDM symbols forming a transmit waveform are packed with services to be delivered over the distribution network. Each symbol comprises a number of sub-carriers that are modulated by the data to be transmitted.

Typically, devices operating on a communication network need to meet a variety of network specifications and/or other certifications. For example, devices under development may undergo multiple field tests to assure that such devices are operating in accordance with selected network specifications. For example, several field tests may be needed to identify device problems and verify the effectiveness of proposed solutions. However, field-testing of devices is expensive and time consuming. For example, as solutions to problems are implemented, each one may need to be independently field tested to evaluate its effectiveness. Furthermore, it is desirable to test devices under a variety of network conditions (or scenarios) so that it is possible to anticipate and/or identify potential problems before they occur. Unfortunately, each field test takes time to perform, may require special network set up, initialization, or operation, and requires a variety of field personnel to implement. Thus, such testing is time consuming and expensive.

Therefore, it would be desirable to have a system that operates to re-create network conditions in a laboratory environment so that devices can be efficiently tested thereby saving the time and costs associated with device field-testing.

SUMMARY

In one or more aspects, a re-creation system is provided that operates to re-create a network environment experienced by a device. In an aspect, the system allows a device to log and store network conditions that exist during an initial field test. The system then processes the stored log to allow subsequent field tests to be conducted in a laboratory environment. As a result, devices under development may be tested more quickly and with less expense under a variety of operating scenarios.

In an aspect, a method for network re-creation is provided. The method comprises determining a logging window, logging at least one re-creation parameter during the logging window to produce a re-creation log, and storing the re-creation log.

In one or more aspects, a re-creation system is provided that operates to re-create a network environment experienced by a device. In an aspect, the system allows a device to log and store network conditions that exist during an initial field test. The system then processes the stored log to allow subsequent field tests to be conducted in a laboratory environment. As a result, devices under development may be tested more quickly and with less expense under a variety of operating scenarios.

In an aspect, an apparatus for network re-creation is provided. The apparatus comprises means for determining a logging window, means for logging at least one re-creation parameter during the logging window to produce a re-creation log, and means for storing the re-creation log.

In an aspect, a computer-readable medium is provided that has a computer program comprising instructions, which when executed, operate to provide a network re-creation. The computer program comprises instructions for determining a logging window, instructions for logging at least one re-creation parameter during the logging window to produce a re-creation log, and instructions for storing the re-creation log.

In an aspect, at least one processor is provided that is configured to perform a method for providing a network re-creation. The method comprises determining a logging window, logging at least one re-creation parameter during the logging window to produce a re-creation log, and storing the re-creation log.

In an aspect, a method for network re-creation is provided. The method comprises obtaining a re-creation log, determining at least one re-creation parameter from the re-creation log, and re-creating a network environment based on the at least one re-creation parameter.

In an aspect, an apparatus for network re-creation is provided. The apparatus comprises a log input configured to obtain a re-creation log, and configuration logic configured to determining at least one re-creation parameter from the re-creation log, and to re-create a network environment based on the at least one re-creation parameter.

In an aspect, an apparatus network re-creation is provided. The apparatus comprises means for obtaining a re-creation log, means for determining at least one re-creation parameter from the re-creation log, means for re-creating a network environment based on the at least one re-creation parameter.

In an aspect, a computer-readable medium is provided that has a computer program comprising instructions, which when executed, operate to provide a network re-creation. The computer program comprises instructions for obtaining a re-creation log, instructions for determining at least one re-creation parameter from the re-creation log, and instructions for re-creating a network environment based on the at least one re-creation parameter.

In an aspect, at least one processor is provided that is configured to perform a method for providing a network re-creation. The method comprises obtaining a re-creation log, determining at least one re-creation parameter from the re-creation log, and re-creating a network environment based on the at least one re-creation parameter.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein:

FIG. 8 shows an aspect a re-creation system; and

FIG. 9 shows an aspect a re-creation system.

DESCRIPTION

The following description describes one or more aspects of a re-creation system. The re-creation system operates to log and re-create a network environment experienced by a device for the purposes of device testing, analysis, operation, and suitability for network operations. The system is especially well suited for use with portable devices having limited resources, but may be used with any type of device. The system may also be used in devices operating in any type of network environment, including but not limited to, communication networks, public networks, such as the Internet, private networks, such as virtual private networks (VPN), local area networks, wide area networks, long haul networks, or any other type of data or communication network.

Figure 1:
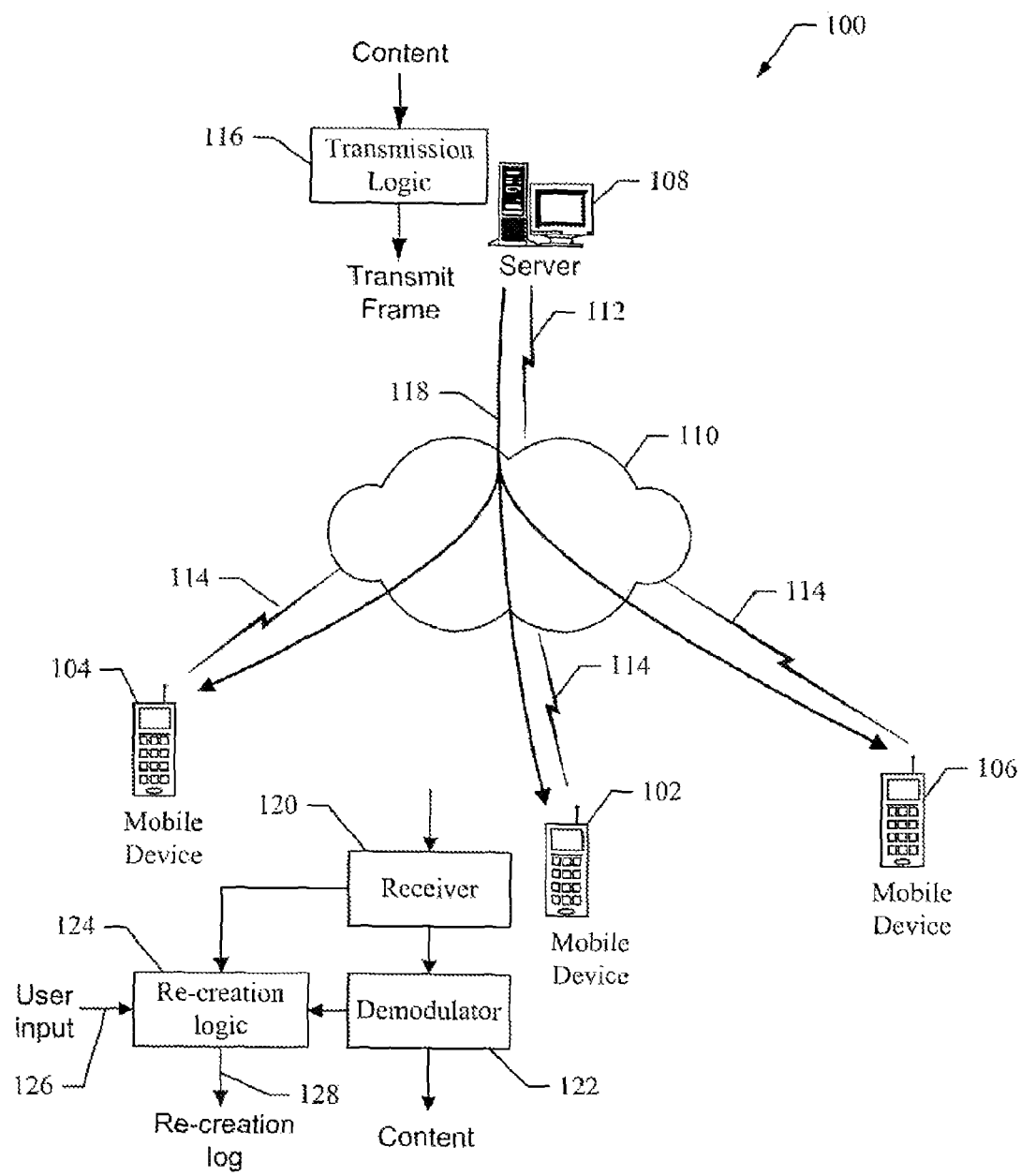
FIG. 1 shows a network that comprises an aspect of a re-creation system.

FIG. 1 shows a network 100 that comprises an aspect of a re-creation system. The network 100 comprises mobile devices 102, 104, 106, a server 108, and a communication network 110. For the purpose of this description, it will be assumed that the network 110 operates to provide communications with and one or more mobile devices using OFDM technology; however, aspects of the re-creation system are suitable for use with other transmission technologies as well.

In an aspect, the server 108 operates to provide services that may be subscribed to by devices in communication with the network 110. The server 108 is coupled to the network 110 through the communication link 112 that comprises any suitable communication link. The network 110 comprises any combination of wired and/or wireless networks that allows services to be delivered from the server 108 to devices in communication with the network 110, such as the device 102.

The devices 102, 104, and 106 in this aspect comprise mobile telephones that communicate with the network 110 through the wireless links 114. The wireless links 114 comprises a forward communication channel based on OFDM technology, and a reverse communication link based on any suitable reverse link technology. It should be noted however, that in other aspects, the wireless links 114 may comprise any other suitable wireless technologies that operate to allow devices to communicate with the network 110. For the remainder of this description, aspects of the re-creation system are described with reference to the device 102; however, the aspects are equally applicable to the devices 104 and 106.

It should be noted that the network 110 could communicate with any number and/or types of devices within the scope of the aspects. For example, other devices suitable for use in aspects of the re-creation system include, but are not limited to, a personal digital assistant (PDA), email device, pager, a notebook computer, mp3 player, video player, or a desktop computer.

The server 108 comprises content that includes real time and non real time services. For example, the services comprise multimedia content that includes news, sports, weather, financial information, movies, and/or applications, programs, scripts, or any other type of suitable content or service. Thus, the services may comprise video, audio, or other information formatted in any suitable format.

The content is input to transmission logic 116, which processes the content to produce a transmission frame. The transmission logic 116 operates to transmit the transmission frame over the network 106 as a transmit waveform 118. For example, the transmission frame may be distributed over the network 110 using a broadcast channel.

The device 102 receives the transmit waveform 118 at a receiver 120, which operates to convert the received waveform to a baseband waveform that is input to a demodulator 122. The demodulator 122 operates to demodulate the baseband waveform to recover the transmitted content.

The device also comprises re-creation logic 124. The re-creation logic 124 receives user input 126 that identifies and/or activates a log window. The log window identifies a time interval during which the re-creation logic 124 will log various re-creation parameters comprising network and device information. For example, the re-creation logic 124 also receives inputs from the receiver 120 and the demodulator 122. The inputs from the receiver 120 and the demodulator 122 provide information that the re-creation logic 124 records in a re-creation log 128. For example, the input from the receiver 120 comprises a received signal strength indicator, and the input from the demodulator 122 comprises error information and demodulation parameters. Once the re-creation log 128 is created, it is stored at the device 102 and later retrieved for used in a controlled environment (i.e., a test laboratory) to re-create the network environment experienced by the device 102. Thus, any operational condition experienced by the device can be re-created, evaluated, analyzed, tested, and otherwise processed to evaluate, certify, or otherwise improve the functionality of the device 102.

Therefore, aspects of a re-creation system operate to generate a re-creation log by performing one or more of the following functions.

a. Receive user input to identify and/or activate a log window.

b. Obtain re-creation parameters from device processing components during the log window, such as a receiver, demodulator or other processing components.

c. Generation a re-creation log containing the re-creation parameters.

d. Store the re-creation log for later processing.

Therefore, aspects of a re-creation system operate to log network and device operational and environmental parameters during a log window. It should be noted that the re-creation system is not limited to the implementations described with reference to FIG. 1, and that other implementations are possible.

Figure 2:
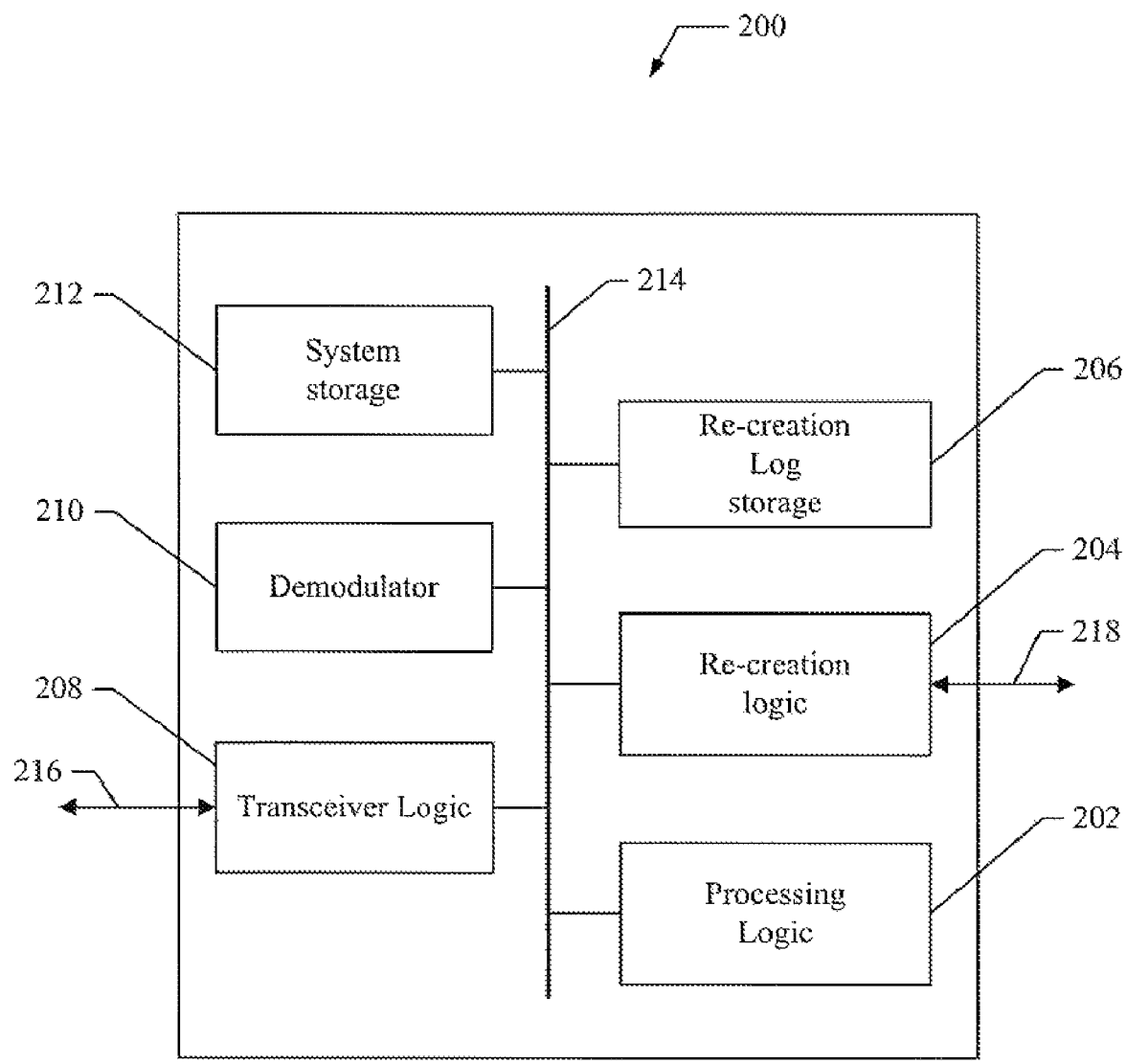
FIG. 2 shows an aspect of re-creation logic for use in a re-creation system.

FIG. 2 shows a device 200 that comprises an aspect of a re-creation system. For example, the device 200 is suitable for use as the device 102 shown in FIG. 1. The device 200 comprises processing logic 202, re-creation logic 204, re-creation log storage 206, transceiver logic 208, demodulator 210, and system storage 212 that are all coupled to a data bus 214.

In one or more aspects, the processing logic 202 comprises a CPU, processor, gate array, hardware logic, memory elements, virtual machine, software, and/or any combination of hardware and software. Thus, the processing logic 202 generally comprises logic to execute machine-readable instructions and to control or communicate with one or more other functional elements of the re-creation logic 200 via the data bus 214.

The transceiver logic 208 comprises hardware logic and/or software that operate to allow the device 200 to transmit and receive data and/or other information with remote devices or systems using communication channel 216. For example, in an aspect, the communication channel 216 comprises a broadcast channel that allows the device 200 to receive a transmitted waveform that comprises content and/or services. In an aspect, the transceiver logic 208 is configured to received a radio frequency (RF) waveform and convert it to a baseband waveform.

The system storage 212 comprises any suitable memory device operable to store system data. For example, the system storage 212 comprises RAM, Flash memory, EEPROM, hard disk, and/or any other type of storage device. In an aspect, the system storage 212 operates to store various device parameters and information that is decoded from a transmit waveform received by the transceiver logic 208.

The demodulator 210 comprises hardware logic and/or software that operate to allow the device 200 to demodulate a received waveform. For example, in an aspect, the demodulator 210 operates to demodulate a baseband waveform to recover transmitted content and/or services. For example, the baseband waveform is provided by the transceiver logic 208.

The re-creation logic 204 comprises a CPU, processor, gate array, hardware logic, memory elements, virtual machine, software, and/or any combination of hardware and software. The re-creation logic 204 operates to receive user input 218 and activate a log window based on the received user input. During the log window, the re-creation logic 204 operates to obtain re-creation parameters relating to the operation of the device 200 and the transmission environment in which It is operating. The re-creation parameters are assembled into a re-creation log that is stored in log storage 206. A more detailed description of the parameters obtained by the re-creation logic 204 is provided in another section of this document.

The re-creation log storage 206 comprises any suitable memory device operable to store re-creation logs generated by the re-creation logic 204. For example, the log storage 206 may comprise RAM, Flash memory, EEPROM, hard disk, and/or any other type of storage device.

In one or more aspects, the re-creation system operates to create one or more re-creation logs by performing one or more of the following functions.

1. Determine a log window that defines a selected time interval.
2. Obtain re-creation parameters within the time window.
3. Generate a re-creation log comprising the re-creation parameters.
4. Store the re-creation log for later processing.

In an aspect, the re-creation system is embodied in a computer program having one or more program instructions ("instructions") stored on a computer-readable medium, which when executed by at least one processor, provides the functions described herein. For example, the program instructions may be loaded into the device 200 from a computer-readable media, such as a floppy disk, CDROM, memory card, FLASH memory device, RAM, ROM, or any other type of memory device or computer-readable medium that interfaces to the device 200. In another aspect, the instructions may be downloaded into the device 200 from an external device or network resource that interfaces to the device 200 through the transceiver logic 208. The program instructions, when executed by the processing logic 202, provide aspects of a re-creation system as described herein.

Figure 3:
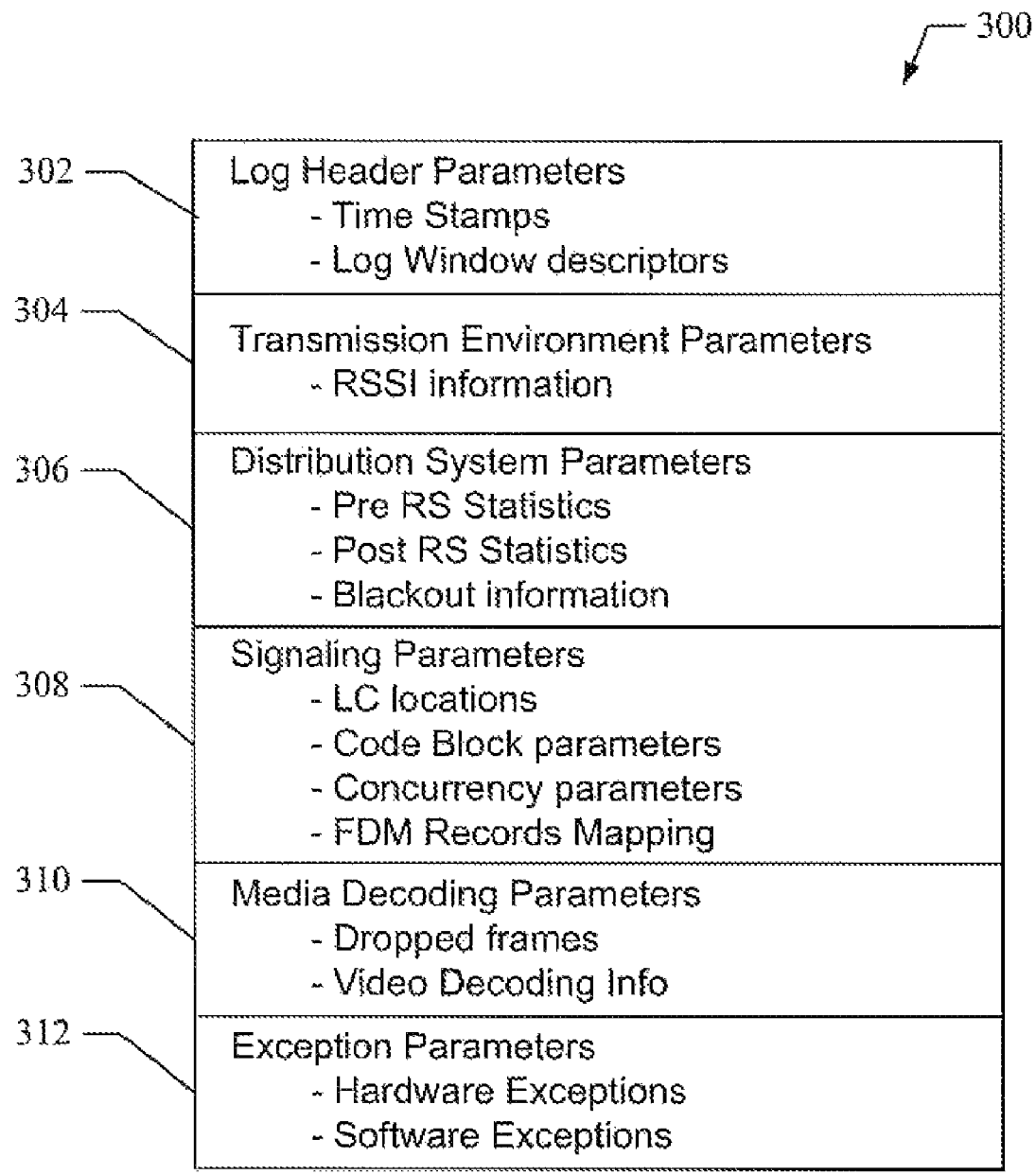
FIG. 3 shows an aspect of a re-creation log for use in a re-creation system.

FIG. 3 shows a re-creation log 300 for use in aspects of a re-creation system. For example, in an aspect, the re-creation logic 300 is generated by the re-creation logic 204 shown in FIG. 2. The recreation log 300 comprises parameters in the following categories.

1. Log Header Parameters (302)
2. Transmission Environment Parameters (304)
2. Distribution System Parameters (306)
3. Signaling Parameters (308)
4. Media Decoding Parameters (310)
5. Exception Parameters (312)

A description of the parameters included in the re-creation log 300 is provided below. It should be noted that any of the described parameters may comprise one or more values.

Re-Creation Log Header Parameters

These parameters provide header information that identifies the log, the device in which the log was created, log window, other time stamps, and any other suitable information.

Transmission Environment Parameters

RSSI Dynamic Parameters

These parameters give continuous readings (at selected intervals) of the received signal strength for the frequency in which the device is operating during the log window.

Distribution System Parameters

Pre-Reed Solomon and Post-RS Statistical Parameters

These parameters contain the erasure rate or error rate as detected by the device during the log window. The device keeps track of how many physical layer packets (PLP) have been decoded in a Superframe worth of data, keeps separate account of good PLPs and Bad PLPs based on a CRC check, and keeps the cumulative counts of these numbers.

Blackout Information Parameters

These parameters describe information that is used to reconstruct media flows that have been blacked out. This information contains the number of flows that are affected by a BLACKOUT messages sent by the network and the list of local overhead information (LOI) identifiers that are included in the BLACKOUT message.

Signaling Parameters

Logical Channel (LC) Parameters

These parameters provide information describing the logical channels that are decoded during the log window. For example, the LC location, scheduling information, transmit mode, outer code, number of code blocks, indicators that indicate if both streams of an LC are use or not, and other LC relevant information.

Code Block Dynamic Parameters

These parameters give the number of code blocks that are not decoded correctly. Whenever a code block has any erasures, this information is logged to indicate which PLP of that code block contains the erasures.

Concurrency Operation information Parameters

These parameters describe if any network concurrency issues occurred during the log window. For example, the concurrent operation of CDMA 1X, WCDMA, and/or HDR networks may affect device performance.

FDM Records Mapping Table Parameters

These parameters give information on the mapping between the media flow identifiers, logical channel identifiers, and other information such as the transmit mode of a logical channel, outer code parameters, and whether or not a logical channel includes both the streams.

Media Decoding Parameters

Dropped Frame Count Parameters

These parameters give the number of Video or Audio frames that have been dropped for a variety of reasons. This information is used to generate media clips on the network side while re-creating various operating scenarios.

Video Decoding/Rendering Parameters

These parameters describe the number of times video frames have decoded successfully and number of times video frames have been rendered. This is used to re-create scenarios at the media player level.

Exception Parameters

Hardware and Software Exception Parameters

These parameters give the number of times the device had undergone some exceptions during the log window. This is used to re-create the conditions that caused the exceptions to occur.

Thus, the re-creation log 300 provides a comprehensive list of parameters and indicators describing the operation of a device and the network environment in which it is operating.

Figure 4:
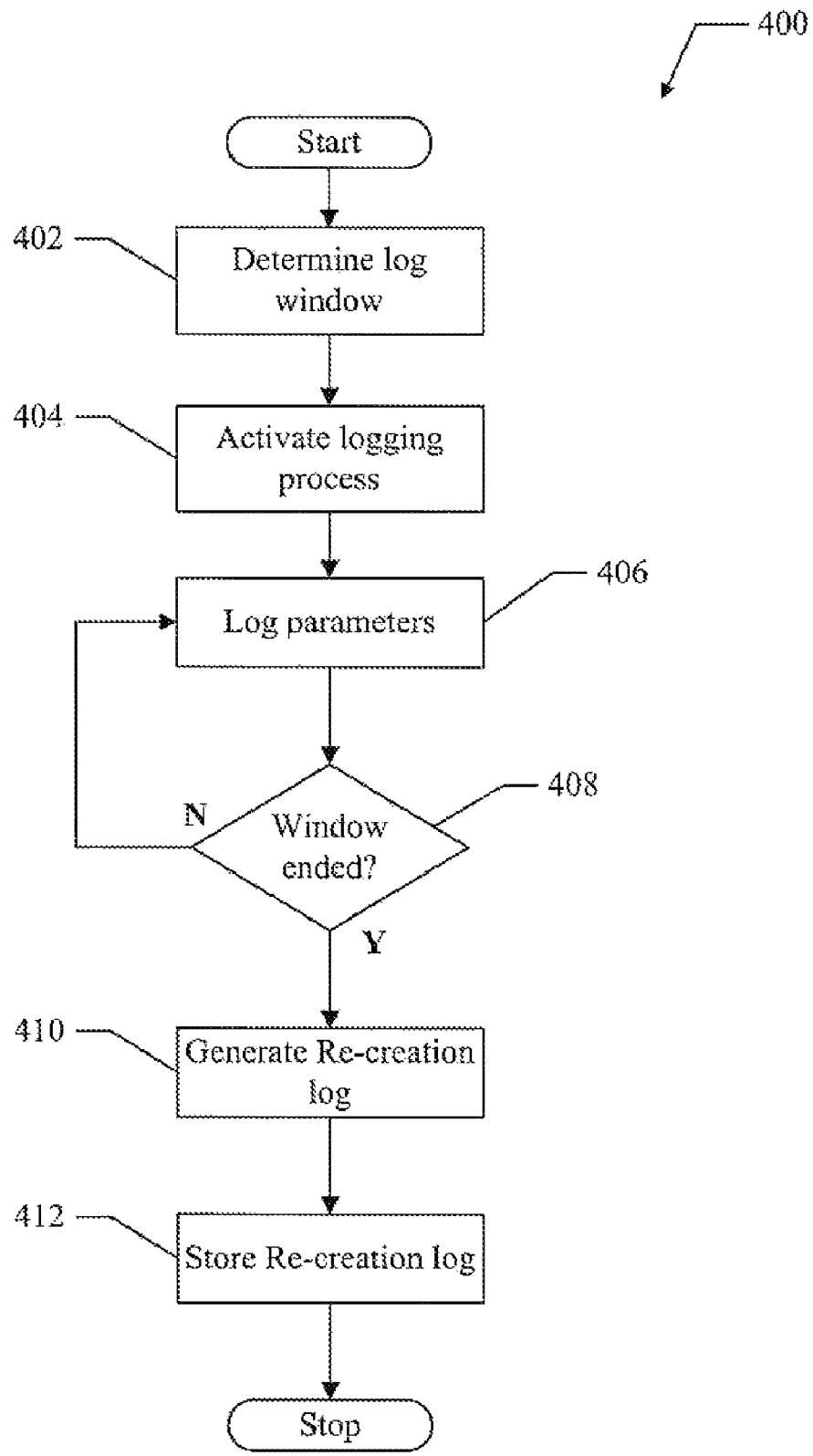
FIG. 4 shows a method for providing an aspect a re-creation system.

FIG. 4 shows a method 400 for providing an aspect of a re-creation system. For clarity, the method 400 is described herein with reference to the device 200 shown in FIG. 2. For example, in an aspect, the re-creation logic 204 executes machine-readable instructions to perform the functions described below.

At block 402, a log window is determined. For example, the log window represents a time interval during which logging of re-creation parameters occurs. In an aspect, the re-creation logic 204 determines a log window based on user input 218. In another aspect, parameters describing the log window are pre-programmed into the re-creation logic 204, or downloaded to the re-creation logic 204 using the transceiver logic 208.

At block 404, a logging process is activated for the duration of the log window. For example, during the log window a variety of re-creation parameters comprising device and network parameters are logged. In an aspect, the re-creation logic 204 operates to determine when the log window begins based on received user input and activates logging procedures at the designated time.

At block 406, re-creation parameters are logged. In an aspect, the re-creation logic 204 operates to log the various parameters by communicating with the system storage 212, demodulator 210, and transceiver logic 208 to obtain the desired parameters.

At block 408, a test is performed to determine if the log window has ended. In an aspect, the re-creation logic 204 operates to determine whether the log window has ended. If the log window has not ended, the method proceeds to block 406 to log additional parameters. If the log window has ended, the method proceeds to block 410.

At block 410, a re-creation log is generated. In an aspect, the re-creation logic 204 operates to generate a re-creation log based on the logged re-creation parameters. For example, in an aspect, the re-creation log is formatted as shown in FIG. 3.

At block 412, the re-creation log is stored. In an aspect, the re-creation logic 204 operates to store the re-creation log into the re-creation log storage 206.

Thus, the method 400 operates to provide an aspect of a re-creation system for use in a device. It should be noted that the method 400 represents just one implementation and that other implementations are possible within the scope of the described aspects.

Figure 5:
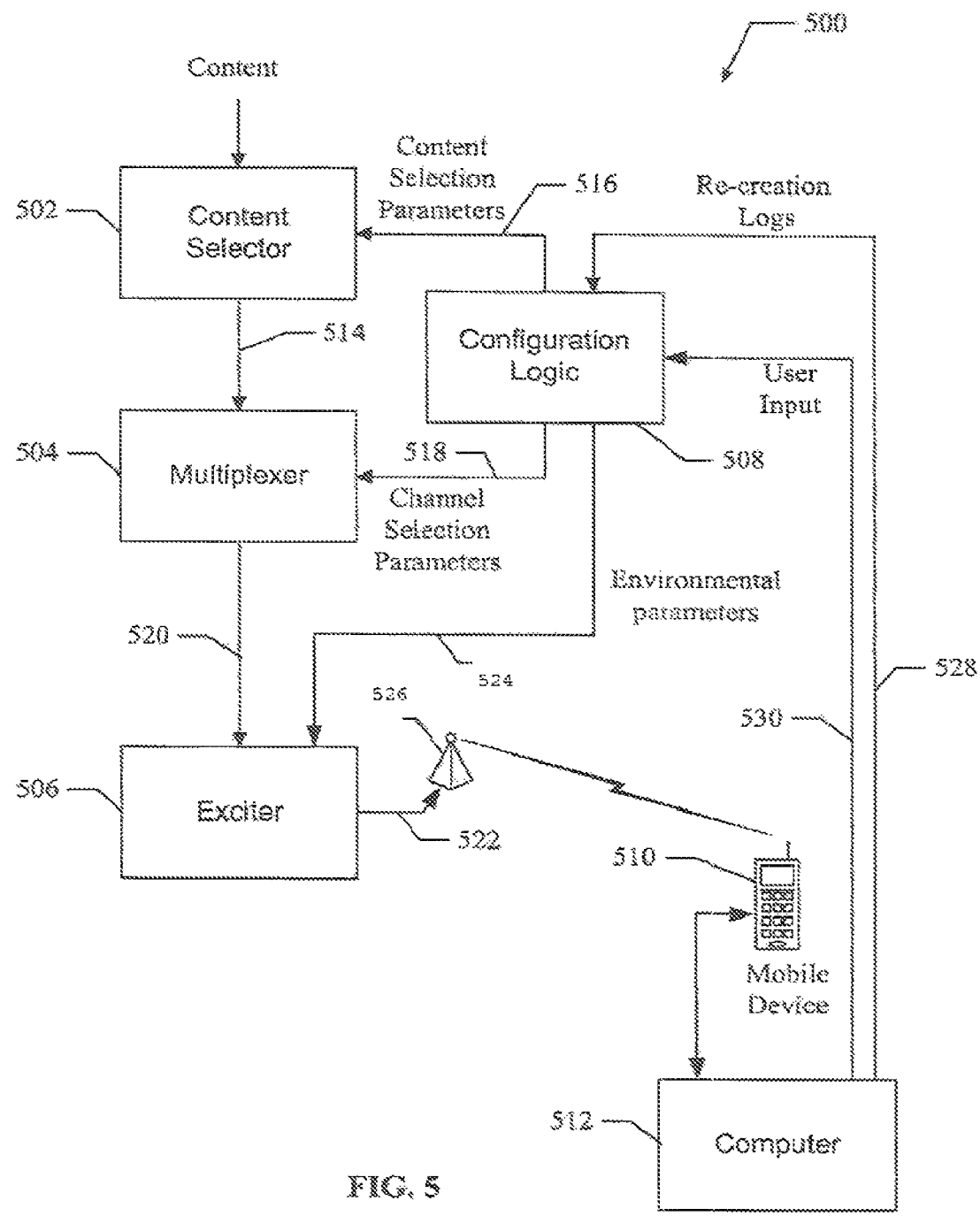
FIG. 5 shows an aspect of a re-creation system.

FIG. 5 shows an aspect of a re-creation system 500. The re-creation system 500 comprises a content selector 502, multiplexer 504, exciter 506, configuration logic 508, device 510, and computer 512.

The content selector 502 comprises any suitable hardware and/or software and operates to receive content flows comprising one or more media flows (i.e., audio and/or video). The content selector 502 also operates to output selected content flows 514 based on content selection parameters 516.

The multiplexer 504 comprises any suitable hardware and/or software and operates to receive the selected content 514 and pack it into logical channels of a transmission frame based on a channel selection parameters 518 to produce a transmission frame 520.

The exciter 506 comprises any suitable hardware and/or software and operates to receive the transmission frame 520 and modulate it to produce a transmit waveform 522. In an aspect, the exciter 506 operates to produce the transmit waveform 522 based on received environmental parameters 524 that indicate signal strength and other environmental conditions. The transmit waveform 522 is then transmitted using the antenna 526.

The device 510 may be the mobile device 102 shown in FIG. 1. The device 510 is coupled to the computer 512 so that the state of the device 510 can be monitored as it receives the transmit waveform 522. The device 510 includes re-creation logs that were generated during one or more log windows that occurred while the device was in the field and in communication with a communication network. The re-creation logs are transferred from the device 510 to the computer 512.

The computer 512 comprises any suitable computing device and operates to monitor the state of the device 510, process re-creation logs obtained from the device 510, and generate test scenarios that are to be used to test the device 510. The computer 512 operates to obtain the stored re-creation logs from the device 510 and transfer the re-creation logs 528 to the configuration logic 508. Additionally, test scenarios and other information generated by the computer operator are transferred to the configuration logic 508 as user input information 530.

During operation, the configuration logic 508 operates to receive re-creation logs 528 and user input 530 to generate the content selection parameters 516, the channel selection parameters 518, and the environmental parameters 524. In an aspect, the configuration logic 508 generates the above parameters to re-create the network environment experienced by the device 510 during operation on a communication network. For example, the re-creation parameters in a re-creation log are used to generate the parameters 516, 518, and 524 so that the generated transmit waveform (i.e., waveform 522) will have the same characteristics as that experienced by the device in the field. Furthermore, the user input 530 operates to provide additional control so that various testing conditions can be generated to allow a variety of network and distribution system scenarios to be simulated.

Therefore, aspects of the configuration logic 508 operate to provide the following functions.

1. Re-create a network environment experienced by device by generating the parameters 516, 518, and 524.

2. Re-create known device problems to be analyzed
3. Test various aspects of device operations under various network conditions.
4. Generate additional test scenarios.

Figure 6:
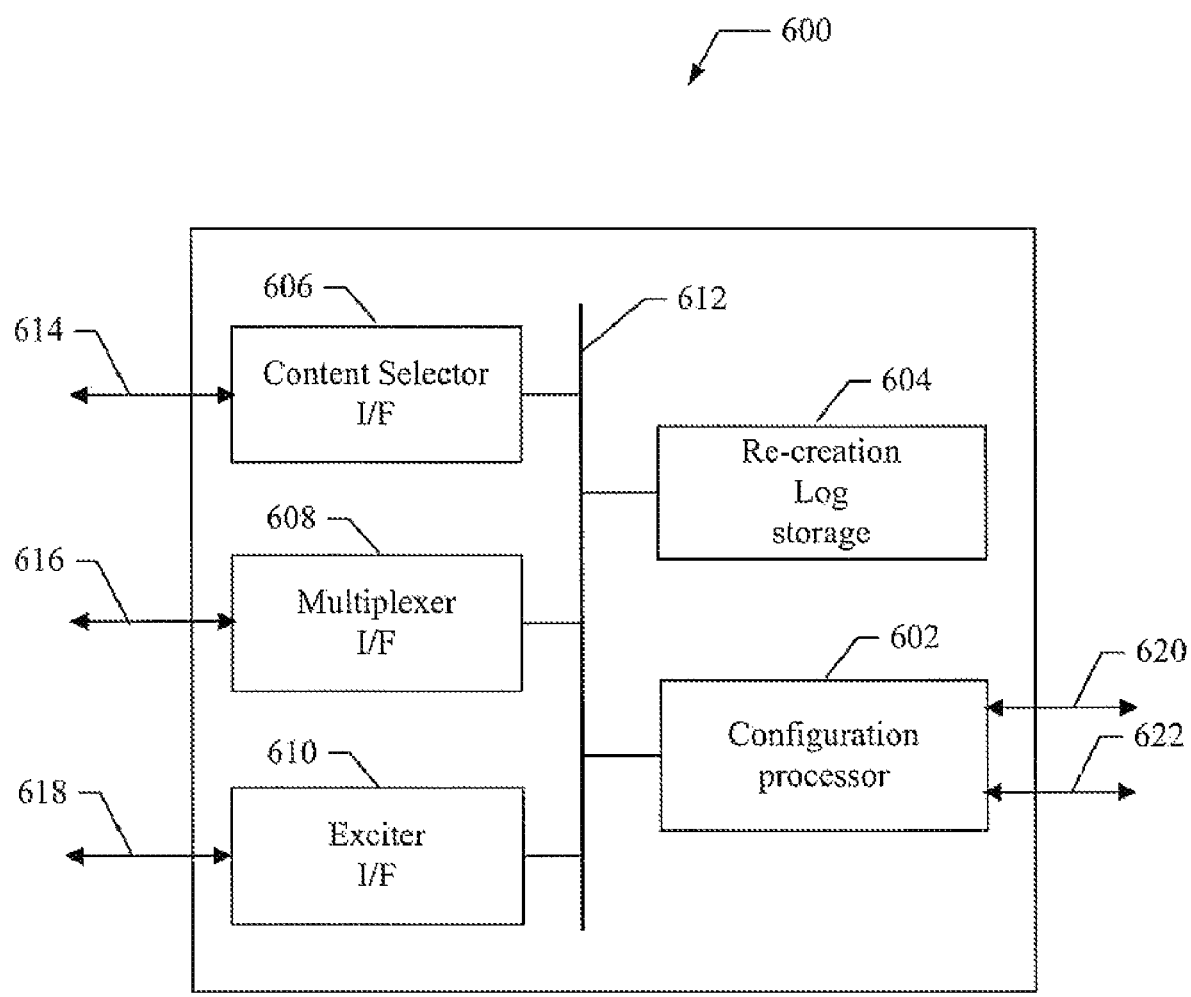
FIG. 6 shows an aspect of configuration logic for use in a re-creation system.

FIG. 6 shows an aspect of configuration logic 600 for use in a re-creation system. For example, the configuration logic 600 is suitable for use as the configuration logic 508 shown in FIG. 5. The configuration logic 600 comprises a configuration processor 602, re-creation log storage 604, a content selector interface (I/F) 606, a multiplexer I/F 608, and an exciter I/F 610, which are all coupled to a data bus 612.

In one or more aspects, the configuration processor 602 comprises a CPU, processor, gate array, hardware logic, memory elements, virtual machine, software, and/or any combination of hardware and software. Thus, the configuration processor 602 generally comprises logic to execute machine-readable instructions and to control or communicate with one or more other functional elements of the configuration logic 600 via the data bus 612.

The configuration processor 602 also comprises input logic to receive a re-creation log 620 and user input 622. In an aspect, the configuration processor 602 operates to receive the re-creation log 620 and store it in the re-creation log storage 604. The configuration processor 602 receives the user input 622 and operates to generate various parameters based on the user input 622.

The re-creation log storage 604 comprises any suitable memory device operable to store re-creation logs. For example, the re-creation log storage 604 comprises RAM, Flash memory, EEPROM, hard disk, and/or any other type of storage device. In an aspect, the re-creation log storage 604 operates to store re-creation logs obtained from a device (i.e., the device 510 shown in FIG. 5).

The content selector I/F 606 comprises a CPU, processor, gate array, hardware logic, memory elements, virtual machine, software, and/or any combination of hardware and software. The content selector I/F 606 operates to output a content selection parameters 614 that are input to a content selector for the purpose of selecting content to be included in a transmit waveform. In an aspect, the content selection parameters 614 comprise parameters formatted using any suitable format or technology that allows the content selector I/F 606 to communicate with a content selector.

The multiplexer I/F 608 comprises a CPU, processor, gate array, hardware logic, memory elements, virtual machine, software, and/or any combination of hardware and software. The multiplexer I/F 608 operates to output channel selection parameters 616 that are input to a multiplexer for the purpose of selecting channels to be included in a transmit waveform. In an aspect, the channel selection parameters 616 comprise parameters formatted using any suitable format or technology that allows the multiplexer I/F 608 to communicate with a multiplexer.

The exciter I/F 610 comprises a CPU, processor, gate array, hardware logic, memory elements, virtual machine, software, and/or any combination of hardware and software. The exciter I/F 610 operates to output environmental parameters 618 that are input to an exciter for the purpose of generating a transmit waveform having selected characteristics. In an aspect, the environmental parameters 618 comprise parameters formatted using any suitable format or technology that allows the exciter I/F 610 to communicate with an exciter.

During operation, the configuration logic 600 operates to receive a re-creation log 620 and user input 622 and generate various parameters to re-creation a selected network environment. For example, the re-creation parameters contained in the re-creation log are used to generate the content selection parameters 614, the channel selection parameters 616, and the environmental parameters 618. The generated parameters are output and used to re-creation network conditions that existed when the received re-creation log 620 was created. In another aspect, the configuration processor 602 obtains the re-creation log from the log storage 604 to generate the above parameters.

In one or more aspects, the configuration logic 600 operates to generate a network re-creation by performing one or more of the following functions.
1. Obtain a re-creation log containing re-creation parameters.
2. Receive user input.
3. Generate a content selection parameters, channel selection parameters and environmental parameters based on the re-creation parameters and the user input.
4. Output the generated parameters to re-create a selected network environment.

In an aspect, operations of the configuration logic 600 are embodied in a computer program having one or more program instructions ("Instructions") stored on a computer-readable medium, which when executed by at least one processor provides the functions described herein. For example, the program instructions may be loaded into the configuration logic 600 from a computer-readable media, such as a floppy disk, CDROM, memory card, FLASH memory device, RAM, ROM, or any other type of memory device or computer-readable medium that interfaces to the configuration logic 600. In another aspect, the instructions may be downloaded to the configuration logic 600 from an external device or network resource that interfaces to the configuration logic 600. The program instructions, when executed by at least one processor at the configuration logic 600 operate to provide aspects of a re-creation system as described herein.

Figure 7:
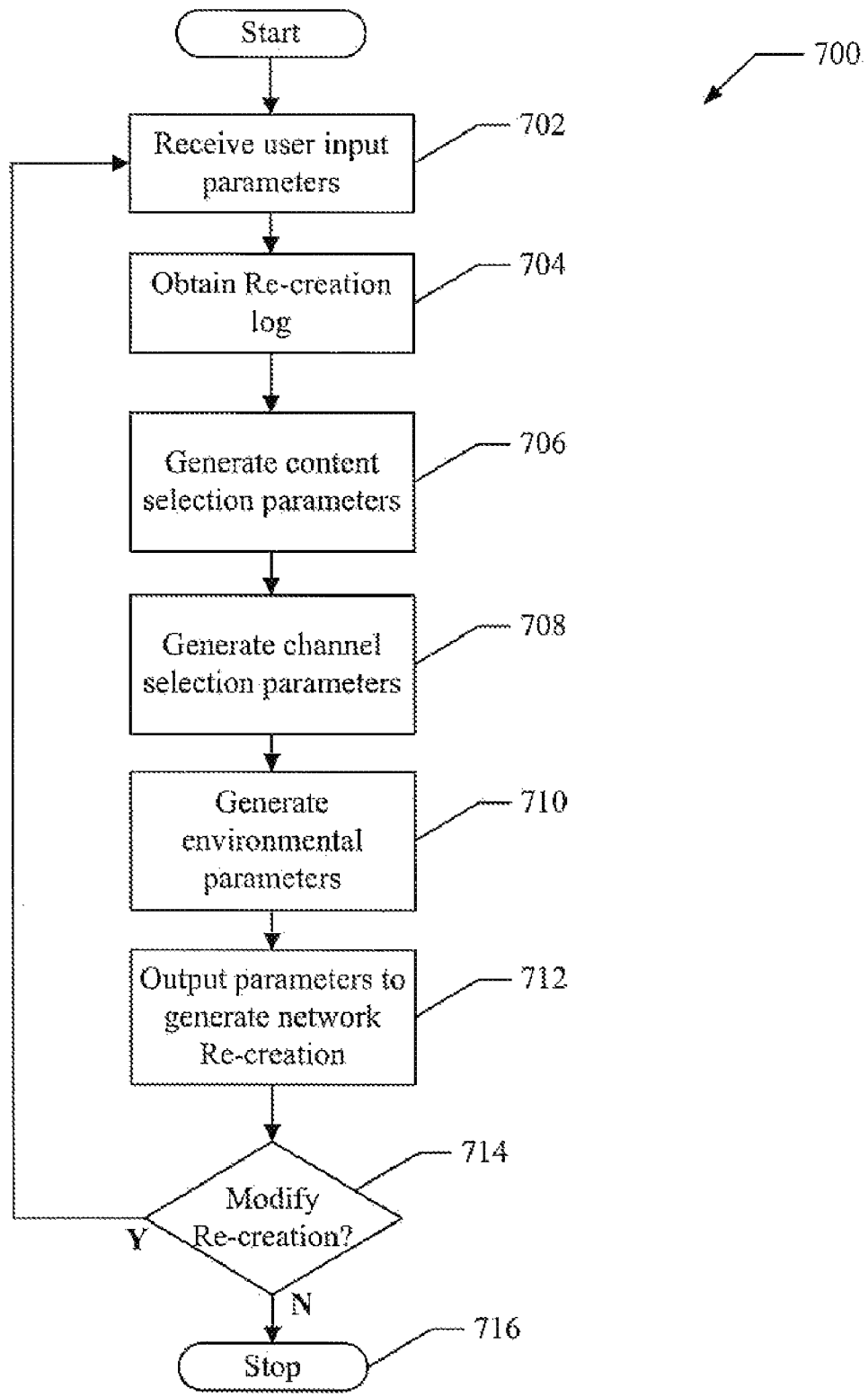
FIG. 7 shows a method for providing an aspects a re-creation system.

FIG. 7 shows a method 700 for providing an aspect of a re-creation system. For clarity, the method 700 is described herein with reference to the configuration logic 600 shown in FIG. 6. For example, in an aspect, at least one processor at the configuration logic 600 executes machine-readable instructions to perform the functions described below.

At block 702, user input parameters are received. For example, the input parameters comprise device test parameters, network conditions, content selection, channel definitions, and transmission parameters. In an aspect, the input parameters are provided by test personnel and input to a re-creation system for laboratory testing of a device. In an aspect, the input parameters are generated at the computer 512 and input to the configuration logic 508 as shown at 530.

At block 704, a re-creation log is obtained. For example, the re-creation log identifies a variety of re-creation parameters logged by a device during actual field tests. For example, the re-creation parameters in the re-creation log are formatted as shown in FIG. 3. In an aspect, the re-creation log is obtained by the device 510 and input to configuration logic 508 as shown at 528. In another aspect, the re-creation log is retrieved from log storage 604.

At block 706, content selection parameters are generated. For example, the content selection parameters identify content that is to be selected for use in a network re-creation. In an aspect, the configuration logic 600 operates to generate the content selection parameters based on the user inputs 622 and the re-creation log 620.

At block 708, channel selection parameters are generated. For example, the channel selection parameters indicate logical channels that are to be configured for use in a network re-creation. In an aspect, the configuration logic 600 operates to generate the channel selection parameters based on the user inputs 622 and the re-creation log 620.

At block 710, environmental parameters are generated. For example, the environmental parameters indicate transmission characteristics and other environment parameters that are to be use in a network re-creation. In an aspect, the configuration logic 600 operates to generate the environmental parameters based on the user inputs 622 and the re-creation log 620.

At block 712, a network re-creation is generated. For example, the configuration logic 600 operates to output the content selection parameters 614, channel selection parameters 616, and the environmental parameters 618 to allow laboratory equipment to re-create a network environment.

At block 716, a test is performed to determine if the network re-creation is to be modified. A network re-creation is performed that produces the transmit waveform 522 that is used to test the device 510. The test determines if the network re-creation needs to be adjusted to further test the device 510 or if various test scenarios are to be re-created to ascertain device 510 operation under one or more test conditions. If the network re-creation is to be modified, the method proceeds to block 702. If the network re-creation does not need to be modified, the method ends at block 716.

Thus, the method 700 operates to provide a re-creation system that allows a device to be test under re-created network conditions. It should be noted that the method 700 represents just one implementation and that other implementations are possible within the scope of the described aspects.

FIG. 8 shows an aspect of a re-creation system 800. The re-creation system 800 comprises means (802) for determining a logging window, which in an aspect comprises the re-creation logic 204 determining a logging window based on the user input 218. The re-creation system 800 also comprises means (804) for logging at least one re-creation parameter, which in an aspect comprises the re-creation logic 204 obtaining at least one re-creation parameter from any or all of the system storage 212, demodulator 210, and transceiver 208. The re-creation system 800 also comprises means (806) for storing a re-creation log, which in an aspect comprises log storage 206. In an aspect, the means (802, 804, and 806) are provided by at least one processor configured to execute a computer program.

FIG. 9 shows an aspect of a re-creation system 900. The re-creation system 900 comprises means (902) for obtaining a re-creation log, which in an aspect comprises the configuration processor 602 or the re-creation log storage 604. The re-creation system 900 also comprises means (904) for determining at least one re-creation parameter from the re-creation log, which in an aspect comprises the re-creation processor 602. The re-creation system 900 also comprises means (906) for re-creating a network environment based on the at least one parameter, which in an aspect comprises the re-creation processor 602. In an aspect, the means (902, 904, and 906) are provided by at least one processor configured to execute a computer program.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may he integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects Accordingly, while one or more aspects of a re-creation system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for providing a network re-creation log on a wireless mobile device connected to a wireless network, the method comprising:

determining a logging window on the wireless mobile device;

the wireless mobile device logging various network re-creation parameters during the logging window to produce a network re-creation log; and storing the network re-creation log on a memory device of the wireless mobile device, wherein said logging comprises logging the various network re-creation parameters during operation on a communication network, and wherein said logging the various network re-creation parameters comprises logging at least:

re-creation log header parameters comprising information that identifies the network re-creation log, the wireless portable device, and log window;

transmission environment parameters comprising Received Signal Strength Indication (RSSI) dynamic parameters comprising readings of the received signal strength for the frequency in which the wireless portable device is operating during the log window;

distribution system parameters comprising pre-Reed Solomon and post-Reed Solomon statistical parameters or obtaining an erasure rate or error rate as detected by the wireless portable device during the log window;

signaling parameters comprising logical channel (LC) parameters describing logical channels that are decoded during the log window, code block dynamic parameters for obtaining a number of code blocks that are not decoded correctly, concurrency operation information parameters that describe if any network concurrency issues occurred during the log window, and Frequency Division Multiplexing (FDM) records mapping table parameters with mapping information between media flow identifiers, logical channel identifiers, and a transmit mode of a logical channel, outer code parameters, and whether or not a logical channel includes both streams;

media decoding parameters comprising dropped frame count parameters and video decoding/rendering parameters for obtaining a number of times video frames have decoded successfully and number of times video frames have been rendered; and hardware and software exception parameters for obtaining a number of times the wireless portable device had undergone exceptions during the log window.

2. The method of claim 1, wherein said determining comprises determining the logging window based on user input.

3. The method of claim 1, wherein said determining comprises determining the logging window based a window identifier.

4. The method of claim 1, wherein said determining comprises determining a start time and an end time associated with the logging window.

5. A wireless mobile device connected to a wireless network for providing a network re-creation log, the wireless mobile device comprising:

a network re-creation processor configured to determine a logging window, and log various network re-creation parameters during the logging window to produce a network re-creation log; and log storage configured to store the network re-creation log on the wireless mobile device, wherein said re-creation processor is configured to log the various network re-creation parameters during operation on a communication network, and wherein the various network re-creation parameters comprise at least:

re-creation log header parameters comprising information that identifies the network re-creation log, the wireless portable device, and log window;

transmission environment parameters comprising Received Signal Strength Indication (RSSI) dynamic parameters comprising readings of the received signal strength for the frequency in which the wireless portable device is operating during the log window;

distribution system parameters comprising pre-Reed Solomon and post-Reed Solomon statistical parameters or obtaining an erasure rate or error rate as detected by the wireless portable device during the log window;

signaling parameters comprising logical channel (LC) parameters describing logical channels that are decoded during the log window, code block dynamic parameters for obtaining a number of code blocks that are not decoded correctly, concurrency operation information parameters that describe if any network concurrency issues occurred during the log window, and Frequency Division Multiplexing (FDM) records mapping table parameters with mapping information between media flow identifiers, logical channel identifiers, and a transmit mode of a logical channel, outer code parameters, and whether or not a logical channel includes both streams;

media decoding parameters comprising dropped frame count parameters and video decoding/rendering parameters for obtaining a number of times video frames have decoded successfully and number of times video frames have been rendered; and hardware and software exception parameters for obtaining a number of times the wireless portable device had undergone exceptions during the log window.

6. The wireless mobile device of claim 5, wherein said network re-creation processor is configured to determine the logging window based on user input.

7. The wireless mobile device of claim 5, wherein said network re-creation processor is configured to determine the logging window based a window identifier.

8. The wireless mobile device of claim 5, wherein said network re-creation processor is configured to determine a start time and an end time associated with the logging window.

9. A wireless mobile device connected to a wireless network for providing a network re-creation log, the wireless mobile device comprising:

means for determining a logging window;

means for logging various network re-creation parameters during the logging window to produce a re-creation log; and means for storing the network re-creation log on the wireless mobile device, wherein said means for logging comprises means for logging the various network re-creation parameter during operation on a communication network, and wherein said means for logging the various network re-creation parameters comprises means for logging at least:

re-creation log header parameters comprising information that identifies the network re-creation log, the wireless portable device, and log window;

transmission environment parameters comprising Received Signal Strength Indication (RSSI) dynamic parameters comprising readings of the received signal strength for the frequency in which the wireless portable device is operating during the log window;

distribution system parameters comprising pre-Reed Solomon and post-Reed Solomon statistical parameters or obtaining an erasure rate or error rate as detected by the wireless portable device during the log window;

signaling parameters comprising logical channel (LC) parameters describing logical channels that are decoded during the log window, code block dynamic parameters for obtaining a number of code blocks that are not decoded correctly, concurrency operation information parameters that describe if any network concurrency issues occurred during the log window, and Frequency Division Multiplexing (FDM) records mapping table parameters with mapping information between media flow identifiers, logical channel identifiers, and a transmit mode of a logical channel, outer code parameters, and whether or not a logical channel includes both streams;

media decoding parameters comprising dropped frame count parameters and video decoding/rendering parameters for obtaining a number of times video frames have decoded successfully and number of times video frames have been rendered; and hardware and software exception parameters for obtaining a number of times the wireless portable device had undergone exceptions during the log window.

10. The wireless mobile device of claim 9, wherein said means for determining comprises means for determining the logging window based on user input.

11. The wireless mobile device of claim 9, wherein said means for determining comprises means for determining the logging window based a window identifier.

12. The wireless mobile device of claim 9, wherein said means for determining comprises means for determining a start time and an end time associated with the logging window.

13. A non-transitory computer-readable medium having a computer program stored thereon comprising instructions, which,. when executed on a wireless mobile device connected to a wireless network, operate to provide a network re-creation log, the computer program comprising:

instructions for determining a logging window;

instructions for logging various network re-creation parameters during the logging window to produce a re-creation log; and instructions for storing the network re-creation log on the wireless mobile device, wherein said instructions for logging comprise instructions for logging the various network re-creation parameters during operation on a communication network, and wherein said instructions for logging the various network re-creation parameters comprise instructions for logging at least:

re-creation log header parameters comprising information that identifies the network re-creation log, the wireless portable device, and log window;

transmission environment parameters comprising Received Signal Strength Indication (RSSI) dynamic parameters comprising readings of the received signal strength for the frequency in which the wireless portable device is operating during the log window;

distribution system parameters comprising pre-Reed Solomon and post-Reed Solomon statistical parameters or obtaining an erasure rate or error rate as detected by the wireless portable device during the log window;

signaling parameters comprising logical channel (LC) parameters describing logical channels that are decoded during the log window, code block dynamic parameters for obtaining a number of code blocks that are not decoded correctly, concurrency operation information parameters that describe if any network concurrency issues occurred during the log window, and Frequency Division Multiplexing (FDM) records mapping table parameters with mapping information between media flow identifiers, logical channel identifiers, and a transmit mode of a logical channel, outer code parameters, and whether or not a logical channel includes both streams;

media decoding parameters comprising dropped frame count parameters and video decoding/rendering parameters for obtaining a number of times video frames have decoded successfully and number of times video frames have been rendered; and hardware and software exception parameters for obtaining a number of times the wireless portable device had undergone exceptions during the log window.

14. The non-transitory computer-readable medium of claim 13, wherein said instructions for determining comprise instructions for determining the logging window based on user input.

15. The non-transitory computer-readable medium of claim 13, wherein said instructions for determining comprise instructions for determining the logging window based a window identifier.

16. The non-transitory computer-readable medium of claim 13, wherein said instructions for determining comprise instructions for determining a start time and an end time associated with the logging window.

* * * * *